S. GUMAER.
Corn Sheller.
No. 11,891.
Patented Nov. 7, 1854.
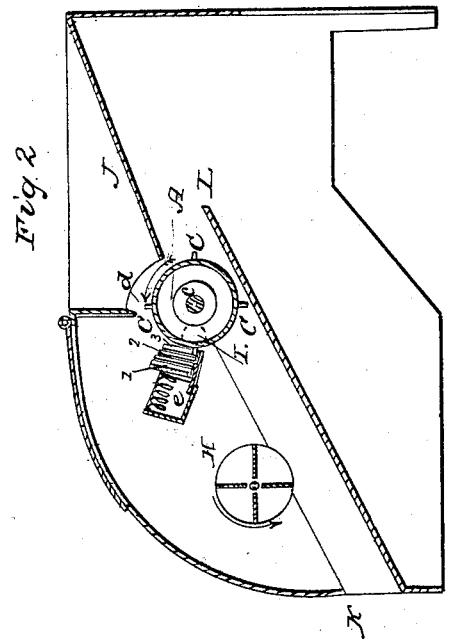
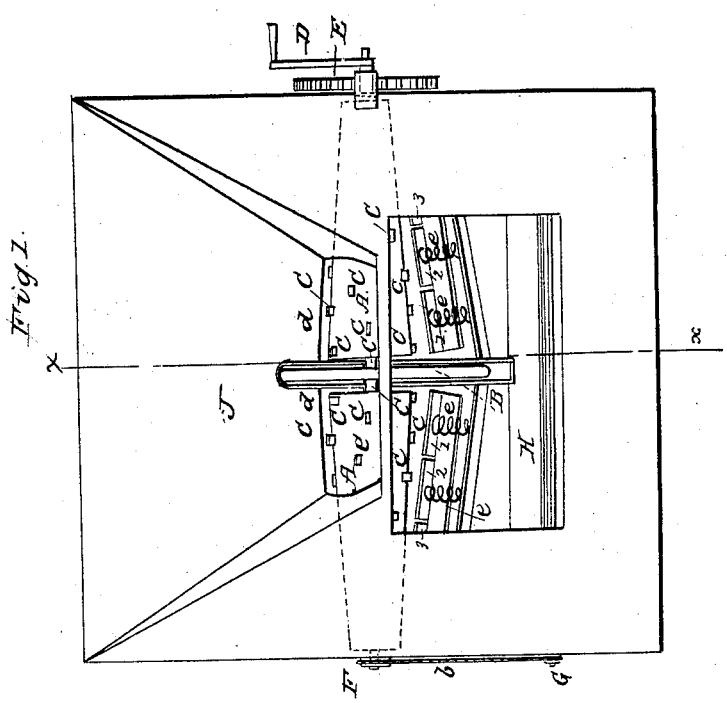

UNITED STATES PATENT OFFICE.

SAMUEL GUMAER, OF AURORA, ILLINOIS.

CORN-SHELLER.

Specification of Letters Patent No. 11,891, dated November 7, 1854.

*To all whom it may concern:*

Be it known that I, SAMUEL GUMAER, of Aurora, in the county of Kane and State of Illinois, have invented certain new and useful Improvements in Self-Feeding Corn-Shellers; and I do hereby declare the following to be a full, clear, and exact description of the same, reference being had to the accompanying drawings, making a part thereof in which—

Figure 1, represents a top view, and Fig. 2, a longitudinal vertical section through the red line $x$, $x$ of Fig. 1.

Similar letters in the two figures denote like parts.

The nature of my invention relates to the so constructing of a corn sheller, as that the ears of corn regardless of their size, may be thrown into the hopper in bulk, from whence the machine takes them up, and over, against a fixed brake where they are partially reduced in size preparatory to their being carried past said brake to complete the shelling operation.

To enable others skilled in the art to make and use my invention, I will proceed to describe the same with reference to the drawings.

The machine may be entirely cased up except so much as will admit of the entrance and delivery of the material.

A, is a double cone cylinder—the base of the cones being separated far enough to admit of a fly or balance wheel B, on their common shaft C, which has journals on each of its ends suitably supported in the sides of the machine. On one end of the machine is placed a crank D, and near it a gear wheel E, on the crank shaft. This gear wheel meshes with a pinion on the end of the shaft of the cone cylinder, and gives motion to said cylinder. On the other end of the cylinder is a pulley F, around which, and another pulley G, on the shaft $a$ of the fan blower H, passes an endless belt $b$, for driving said fan, which may extend through the machine from end to end, and be constructed in any well known manner. The teeth $c$, on the cones run spirally around their perimeters, for two purposes first, for turning the ears of corn, as they take them up from the hopper, and causing them to be brought up against the first brake, parallel therewith, and with the axis of the cones along which they are to move—and secondly to advance the ear of corn which they are shelling along through the machine, to where the cobs are delivered.

$d$, is the fixed brake, against which the ears are carried by the cylinder, and by which the ear is divested of so much of its grains as will allow it to pass under the brake, when it is caught by the spring brakes 1, 2, 3, &c., which hold it up against the cylinder to be entirely divested of the grains. These brakes 1, 2, 3, &c., are sectional, each one being controlled by its own spring $e$ and consequently can yield to the butt or point whichever may go foremost.

It will be perceived that during the two shelling operations the functions of the cylinder are changed—first it carries up the cobs, holds them up, and at the same time advances them along the fixed brake, which shells in part, and after the ears are carried past the fixed brake, then the spring brakes become the holders, while the cylinder shells and advances the ear along to its exit I (in dotted lines) at each end.

J, is the apron of the hopper onto which the ears of corn are thrown in bulk, and from which they are picked up, straightened, and carried up, and through the machine, as described—the machine feeding itself from the hopper. The shelled corn passes out at K, and the impurities at L.

These are two or three modifications of the machine which I design using, and will mention—one is to form a spiral groove in the cylinders at the roots of the teeth, into which the ears may lie as they are being carried up, to form a sort of bed for them. Another is to use a carrying wheel, to carry up the ears from the hopper to the cylinder and brake, instead of making the cylinder itself do it, and I mention these, to prevent others from violating my general plan.

Having thus fully described the nature of my invention, I would state that I do not claim the sectional brakes but

What I do claim therein as new, and desire to secure by Letters Patent, is,

The carrying up of the ears of corn, from the hopper against the brake $d$, by means of the rotation of the cylinder, where the larger portions of the ears are first reduced preparatory to their being finally divested of the grains as described.

SAML. GUMAER.

Witnesses:
A. B. STOUGHTON,
THOS. H. UPPERMAN.